United States Patent
Ko et al.

(10) Patent No.: US 10,727,503 B2
(45) Date of Patent: Jul. 28, 2020

(54) FUEL CELL SEPARATOR FOR PREVENTING FLOODING AND FUEL CELL STACK INCLUDING THE SAME

(71) Applicants: HYUNDAI MOTOR COMPANY, Seoul (KR); KIA MOTORS CORPORATION, Seoul (KR)

(72) Inventors: Jae Jun Ko, Gyeonggi-do (KR); Chi Seung Lee, Seongnam-si (KR); Seung Ah Yu, Incheon (KR); Young Woo Noh, Guri-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 302 days.

(21) Appl. No.: 15/801,199

(22) Filed: Nov. 1, 2017

(65) Prior Publication Data
US 2018/0166705 A1    Jun. 14, 2018

(30) Foreign Application Priority Data
Dec. 14, 2016    (KR) .................. 10-2016-0170566

(51) Int. Cl.
*H01M 8/2483* (2016.01)
*H01M 8/0258* (2016.01)
(Continued)

(52) U.S. Cl.
CPC ....... *H01M 8/0258* (2013.01); *H01M 8/0265* (2013.01); *H01M 8/04156* (2013.01);
(Continued)

(58) Field of Classification Search
None
See application file for complete search history.

(56) References Cited

U.S. PATENT DOCUMENTS 9,023,543 B2    5/2015   Chin
2012/0107704 A1   5/2012   Chin
(Continued)

FOREIGN PATENT DOCUMENTS

| KR | 10-1189580 B1 | 10/2012 |
| KR | 10-1417454 B1 | 7/2014 |
| KR | 10-2016-0057320 A | 5/2016 |

OTHER PUBLICATIONS

M. Kim, et al., "Effects of Anode Flooding on the Performance Degradation of Polymer Electrolyte Membrane Fuel Cells," Journal of Power Source, 2014, vol. 266, pp. 332-340.

*Primary Examiner* — Lucas J. O'Donnell
(74) *Attorney, Agent, or Firm* — Morgan, Lewis & Bockius LLP

(57) ABSTRACT

A separator for a fuel cell includes a channel having a passage that is a flow path of a reaction gas, a manifold part formed at a peripheral of the channel and communicating with the passage such that the reaction gas is introduced into and discharged from the channel, and a connector connecting the channel and the manifold part such that the reaction gas flows between the channel and the manifold part. The manifold part includes an inlet manifold through which the reaction gas is introduced into the channel and formed at a lower portion of the channel, and an outlet manifold configured to discharge the reaction gas from the channel to an outside of the fuel cell and formed at an upper portion of the channel.

9 Claims, 12 Drawing Sheets

(51) Int. Cl.
*H01M 8/242* (2016.01)
*H01M 8/04119* (2016.01)
*H01M 8/0265* (2016.01)
*H01M 8/1018* (2016.01)

(52) U.S. Cl.
CPC ......... *H01M 8/242* (2013.01); *H01M 8/2483* (2016.02); *H01M 2008/1095* (2013.01)

(56) References Cited

U.S. PATENT DOCUMENTS

| | | | |
|---|---|---|---|
| 2012/0251909 A1* | 10/2012 | Narasimhamurthy | ........................ H01M 8/04134 429/429 |
| 2015/0340724 A1* | 11/2015 | Roshanzamir | ...... H01M 8/2484 429/465 |
| 2016/0141637 A1* | 5/2016 | Sato | .................... H01M 8/0258 429/452 |

\* cited by examiner

FUEL CELL SEPARATOR FOR PREVENTING FLOODING AND FUEL CELL STACK INCLUDING THE SAME

CROSS-REFERENCE TO RELATED APPLICATION

This application is based on and claims the benefit of priority to Korean Patent Application No. 10-2016-0170566, filed on Dec. 14, 2016, in the Korean Intellectual Property Office, the disclosure of which is incorporated herein in its entirety by reference.

TECHNICAL FIELD

The present disclosure relates to a separator for a fuel cell and a fuel cell stack including the same, and a separator for a fuel cell that may minimize flooding by allowing flows of condensate generated by a fuel cell stack and introduced into an upper manifold to flow smoothly and a fuel cell stack including the same.

BACKGROUND

A polymer electrolyte membrane fuel cell (PEMFC) is an apparatus for generating electricity through an electrochemical reaction of hydrogen and oxygen, and does not require adjustment of an electrolyte because it achieves a high efficiency as compared with another type of fuel cell, achieves a high current density and a high output density, achieves a short startup time, and uses a solid electrolyte. Further, because a reaction product of the polymer electrolyte membrane fuel cell is pure water, studies on the polymer electrolyte membrane fuel cell are being actively made in automobile industries as an environment-friendly power source.

The fuel cell may obtain high electrical energy by stacking several cells having a voltage to achieve high power. The stack of the individual components is referred to as a fuel cell stack, and generally hundreds of fuel cell stacks or more are stacked to drive a fuel cell vehicle.

The cells in the fuel cell stack include a membrane-electrode assembly that functions as a passage for hydrogen ions for an electrochemical reaction, a separator configured to move a reaction gas and electrons, a gas diffusion layer configured to uniformly decompose the reaction gas, and a gasket for separating hydrogen as the reaction gas, air, and cooling water when the components are stacked to prevent the hydrogen, the air, and the cooling water from being leaked to the outside. The membrane-electrode assembly is classified into an electrolyte membrane and electrodes, and the electrolyte membrane used for the membrane-electrode assembly is mainly famed of a solid polymer, and a thin membrane is used to lower ion conductivity that greatly influences the performance of the fuel cell.

The high polymer electrolyte fuel cell is generally operated at an operation temperature of about −30° C. to 80° C. due to the characteristics of the polymer membrane. The polymer membrane requires conductivity for a high performance. It is the content of water that influences the conductivity most greatly. The excessive amount of water existing in the cells badly influences the performance and durability during an operation of the fuel cell. This is called flooding. Because the excessive amount of water hampers arrival of a gas to the electrodes in view of performance, it greatly increases material transfer resistance, which causes a decrease of performance and fluctuation of cell voltages.

Further, in view of durability, the excessive water, in particular, the water existing in the anode may influence corrosion of carbon of the cathode electrode as well as corrosion of carbon of the anode electrode, and because it may greatly influence the performance of the fuel cell vehicle, a measure for preventing it is necessary.

When a fuel cell stack is manufactured and operated, the unevenness of supply of a fluid may be caused according to the cell design and deviation of quality. FIG. 1 is a view illustrating a fuel cell stack 1 that supplies air from the lower side to the upper side. FIG. 2 is a view illustrating an air lifted separator.

Referring to FIG. 1, the fuel cell stack 1 may include a plurality of unit cells 2 that are stacked, a closed end plate 3a and an opened end plate 3b coupled to the outermost unit cells 2. The opened end plate 3b may include an air inlet 4IN and an air outlet 4OT through which air is introduced and discharged, a hydrogen inlet 5IN and a hydrogen outlet 5OT through which hydrogen is introduced and discharged, and a cooling water inlet 6IN and a cooling water outlet 6OT through which cooling water is introduced and discharged.

Referring to FIG. 2, an air lifted separator may include an air inlet manifold 7IN and an air outlet manifold 7OT communicating with the air inlet 4IN and the air outlet 4OT, and a hydrogen inlet manifold 8IN and a hydrogen outlet manifold 8OT communicating with the hydrogen inlet 5IN and the hydrogen outlet 5OT. Further, the separator may include a cooling water inlet manifold 9IN and a cooling water outlet manifold 9OT communicating with the cooling water inlet 6IN and the cooling water outlet 6OT.

The air lifted separator and the fuel cell stack 1 may improve non-humidification characteristics and low-humidification characteristics, but because water cannot be easily discharged as compared with horizontal supply of water, flooding may occur as the water cannot be easily discharged (see the air outlet manifold of FIG. 2). In particular, because a larger amount of water flowing toward the outlet of the fuel cell stack 1 is collected, a differential pressure of the gas in the passage of the separator for the outlet of the stack further increases. The increased differential pressure of the gas decreases the gas supply speed, and the flooding is accelerated.

FIG. 3 is a graph depicting a characteristic result of distribution of a plurality of cell voltages measured in a condition of 30° in which flooding occurs by using the fuel cell stack 1 to which the air lifted separator as an example. In FIG. 3, as the number of the cells decreases, the cells are disposed closer to the outlet of the stack (the opened end plate).

FIG. 4 is a view schematically illustrating a side sectional surface of the fuel cell stack 1 of FIG. 1. In FIG. 4, the thickness of the arrow facing the upper side indicates a flow rate of a reaction gas flowing from the lower side to the upper side, and the hatched part indicates an amount of residual water of the condensate existing in the outlet manifold.

As in the embodiments of FIGS. 3 and 4, as the condensate discharged to the gas outlet manifolds of the separators of the cells is connected in the outlet of the stack, a larger amount of condensate is distributed at the outlet of the stack in the outlet manifold as illustrated in FIG. 4, and thus the difference between the flow rates of the reaction gas passing through the channels may become larger as it go towards the outlet of the stack. Accordingly, as in the graph of FIG. 3, the performance of the cells disposed at the outlet of the stack may be lowered.

SUMMARY

The present disclosure provides a separator for a fuel cell that may minimize flooding by easily discharging condensate, and a fuel cell stack including the same.

The present disclosure also provides a separator for a fuel cell that may improve the performance of a fuel cell stack by lowering the unevenness of the flows of a gas in a plurality of cells, and a fuel cell stack including the same.

The technical objects of the present disclosure are not limited to the above-mentioned one, and the other unmentioned technical objects will become apparent to those skilled in the art from the following description.

In accordance with an aspect of the present disclosure, a separator for a fuel cell may include a channel having a passage that is a flow path of a reaction gas, a manifold part formed at a peripheral of the channel and communicating with the passage such that the reaction gas is introduced into and discharged from the channel, and a connector connecting the channel and the manifold part such that the reaction gas flows between the channel and the manifold part, in which the manifold part includes an inlet manifold through which the reaction gas is introduced into the channel and formed at a lower portion of the channel, and an outlet manifold configured to discharge the reaction gas from the channel to an outside of the fuel cell and formed at an upper portion of the channel, and a lower surface of the outlet manifold includes a first inclined part inclined downwards towards a part that is not connected to the connector, such that condensate generated by a reaction of the fuel cell and introduced through the connector flows to a part that is not connected to the connector.

The inlet manifold may be an air inlet manifold through which supplied air is introduced into the channel, and the outlet manifold may be an air outlet manifold through which the air is discharged from the channel to the outside.

The inlet manifold may be a hydrogen inlet manifold through which supplied hydrogen is introduced into the channel, and the outlet manifold may be a hydrogen outlet manifold through which the hydrogen is discharged from the channel to the outside.

A lower surface of the outlet manifold may include a first area that is a part connected to the connector, and a second area that is a part extending from the first area and which is not connected to the connector, and the second area may include a stepped part recessed to be stepped downwards from the first inclined part including the first area.

In accordance with another aspect of the present disclosure, there is provided a fuel cell stack including a plurality of unit cells, each of which includes a membrane electrode assembly including an electrolyte membrane, an anode, and a cathode, and separators disposed on opposite sides of the membrane electrode assembly, and which are stacked, and end plates coupled to opposite stack direction sides of the plurality of unit cells to couple the plurality of unit cells and one of the end plates has an inlet and an outlet through which a reaction gas is introduced and discharged, wherein each of the separators includes a channel having a passage that is a flow path of the reaction gas, a manifold part including an inlet manifold, formed at a lower portion of the channel and connected to the inlet to communicate with the passage, configured to introduce the reaction gas into the channel, and an outlet manifold formed at an upper portion of the channel and connected to the outlet, configured to discharge the reaction gas from the channel to an outside of the fuel cell stack, and a connector connecting the channel and the manifold part such that the reaction gas flows between the channel and the manifold part, and wherein a lower surface of the outlet manifold includes a first inclined part downwardly inclined towards a part that is not connected to the connector such that condensate generated by a reaction of a fuel cell and introduced through the connector flows to a part that is not connected to the connector.

Outlet manifolds foiled in a plurality of separators may be connected to each other to form a discharge passage when the plurality of unit cells are stacked, and the discharge passage may include a first inclined surface formed by connecting a plurality of first inclined parts to a lower surface of the discharge passage.

A lower surface of the outlet manifold may include a first area that is a part connected to the connector, and a second area that is a part extending from the first area and which is not connected to the connector, in which the second area may include a stepped part recessed to be stepped downwards from the first inclined part including the first area, and the discharge passage further may include a condensate discharge groove foiled by connecting the plurality of stepped parts in a direction in which the plurality of unit cells are stacked, and connected to the first inclined surface, such that the condensate introduced after flowing along the first inclined surface is discharged.

A lower surface of the condensate discharge groove may include a second inclined surface inclined downwards in a flow direction of the reaction gas.

An insertion body may be inserted into and attached to a lower surface of the condensate discharge groove and has a second inclined surface inclined downwards in a flow direction of the reaction gas.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

First, the embodiments described below are embodiments that are suitable for helping understand the technical features of a separator for a fuel cell and a fuel cell stack including the same according to the present disclosure. The present disclosure is not limited to the embodiments described below and the technical features of the present disclosure are not limited by the embodiments, but various modifications may be made without departing from the technical scope of the present disclosure.

Figure 10:
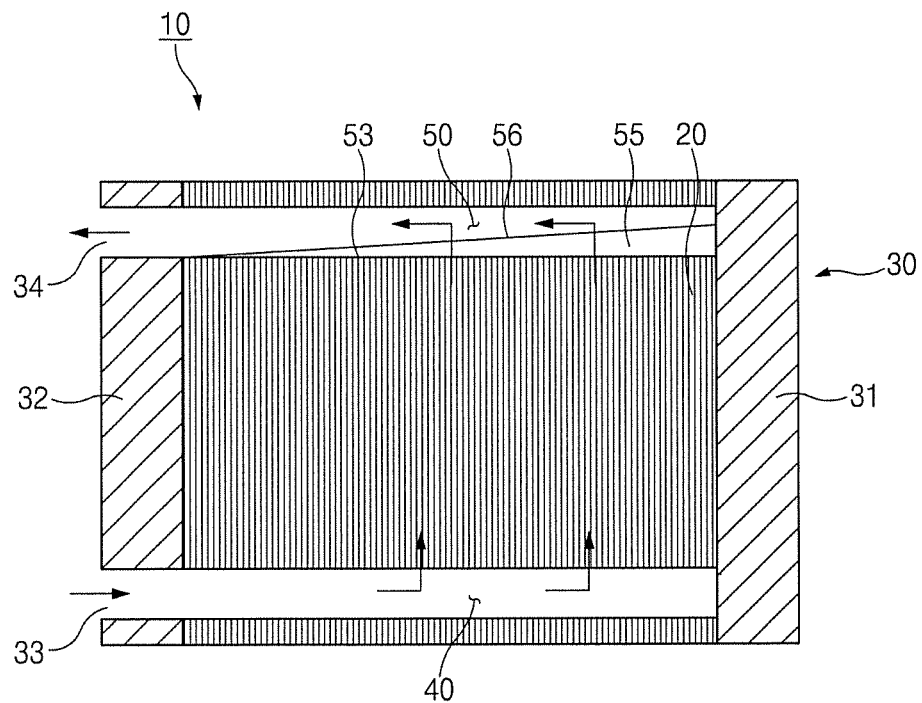
FIG. 10 is a side sectional view illustrating a side section of the fuel cell stack according to the second embodiment of the present disclosure.

The fuel cell stack 10 according to an embodiment of the present disclosure may include a plurality of unit cells 20 that are stacked and an end plate 30 (see FIG. 10).

In detail, each of the unit cells may include a membrane electrode assembly (MEA) disposed at the innermost side thereof, a gas diffusion layer (GDL) stacked on an outside of the MEA, and a separator 200 disposed on an outside of the GDL. The MEA includes an electrolyte membrane that may move hydrogen protons, and a cathode (an air electrode) and a anode (a fuel electrode) that are catalytic layers applied on opposite surfaces of the electrolyte membrane such that hydrogen and oxygen may react each other.

The end plate 30 may include a closed end plate 31 and an opened end plate 32. The closed end plate 31 may be a plate coupled to sides of the plurality of unit cells 20. Further, the opened end plate 32 is coupled to opposite sides of the plurality of unit cells 20, has a plate shape, and an inlet 33 and an outlet 34, through which a reaction gas is introduced and discharged, may be formed in the opened end plate 32. The configuration of the end plate 30 according to the present disclosure is not limited to the above-described one, and for example, opened end plates 32 may be coupled to opposite sides of the plurality of stacked unit cells 20.

According to the end plate 30, the closed end plate 31 and the opened end plate 32 may be coupled to opposite sides (the outermost cells) in a stacking direction of the plurality of unit cells 20 stacked continuously and may couple the plurality of unit cells 20.

Figure 1:
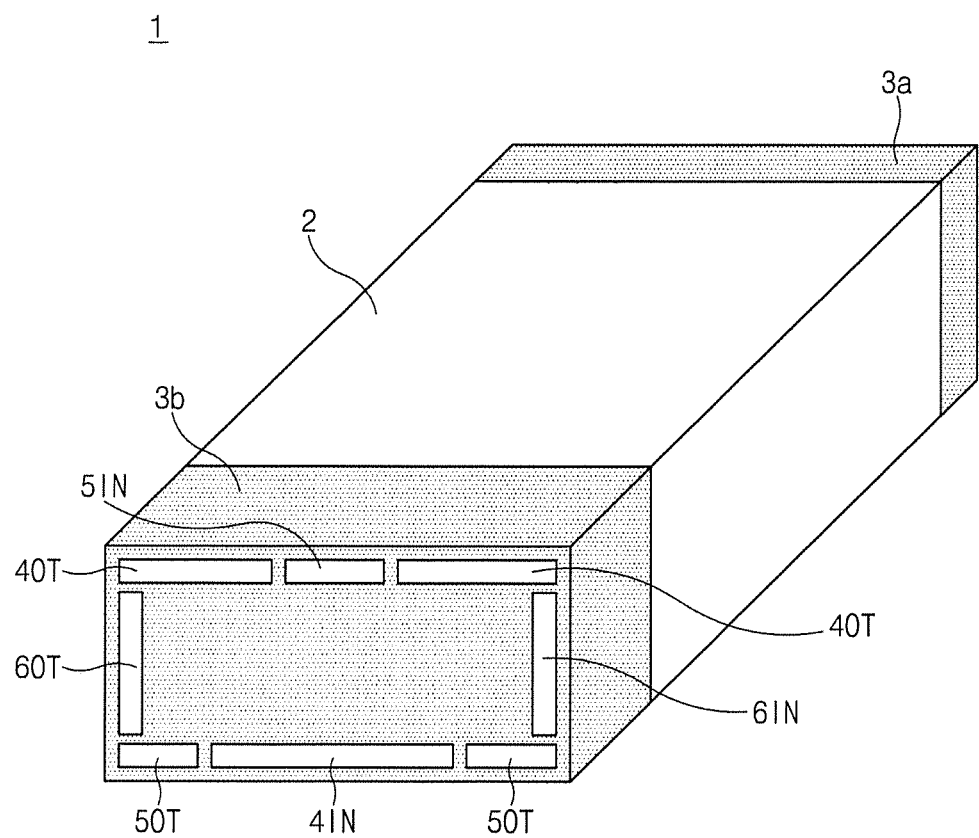
FIG. 1 is a view illustrating an air lifted fuel cell stack according to the related art.
Figure 2:
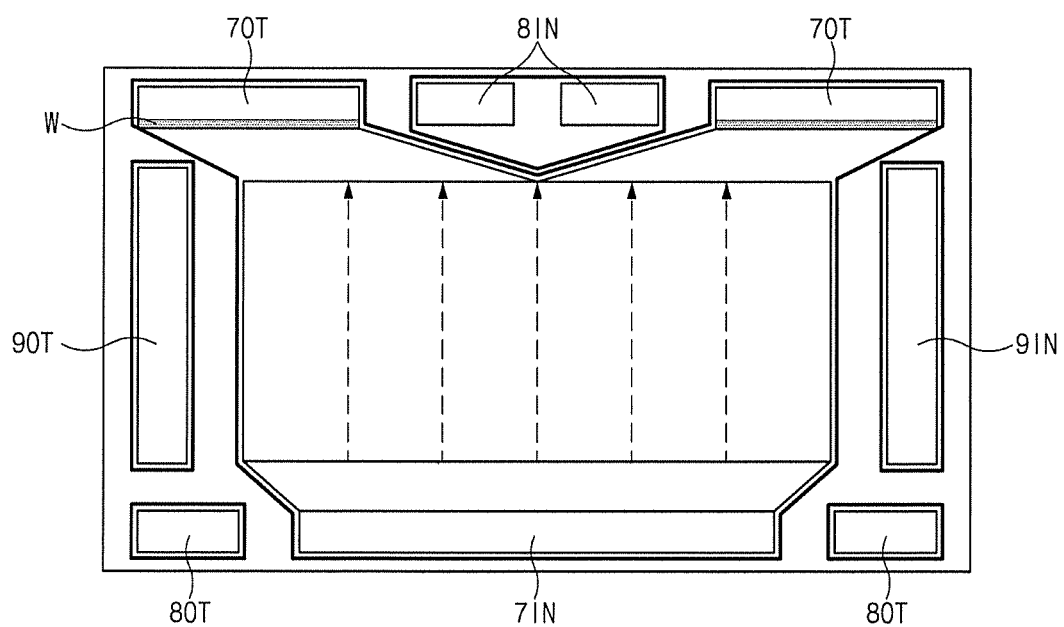
FIG. 2 is a view illustrating an air lifted separator applied to FIG. 1.
Figure 3:
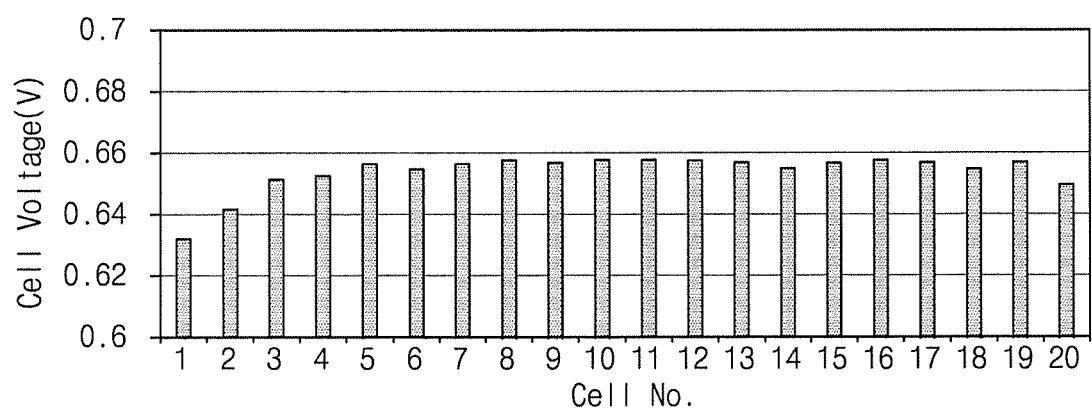
FIG. 3 is a graph depicting a characteristic result of distribution of a plurality of cell voltages in an air lifted fuel cell stack.
Figure 4:
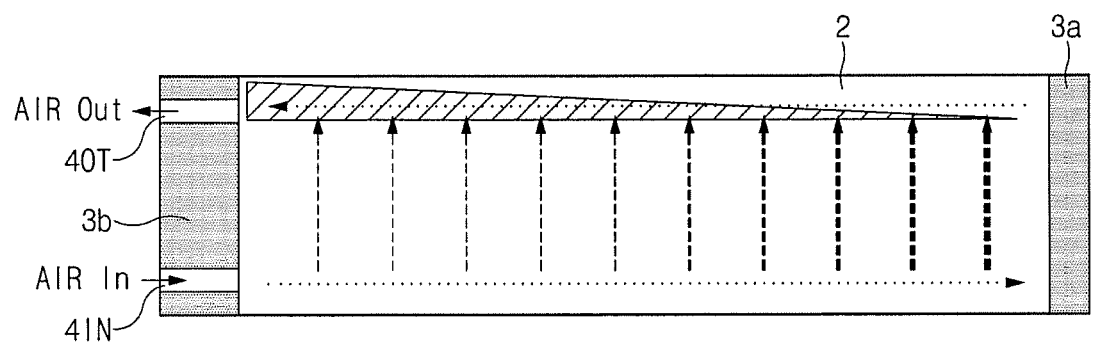
FIG. 4 is a view schematically illustrating a side sectional surface of the fuel cell stack of FIG. 1.
Figure 5:
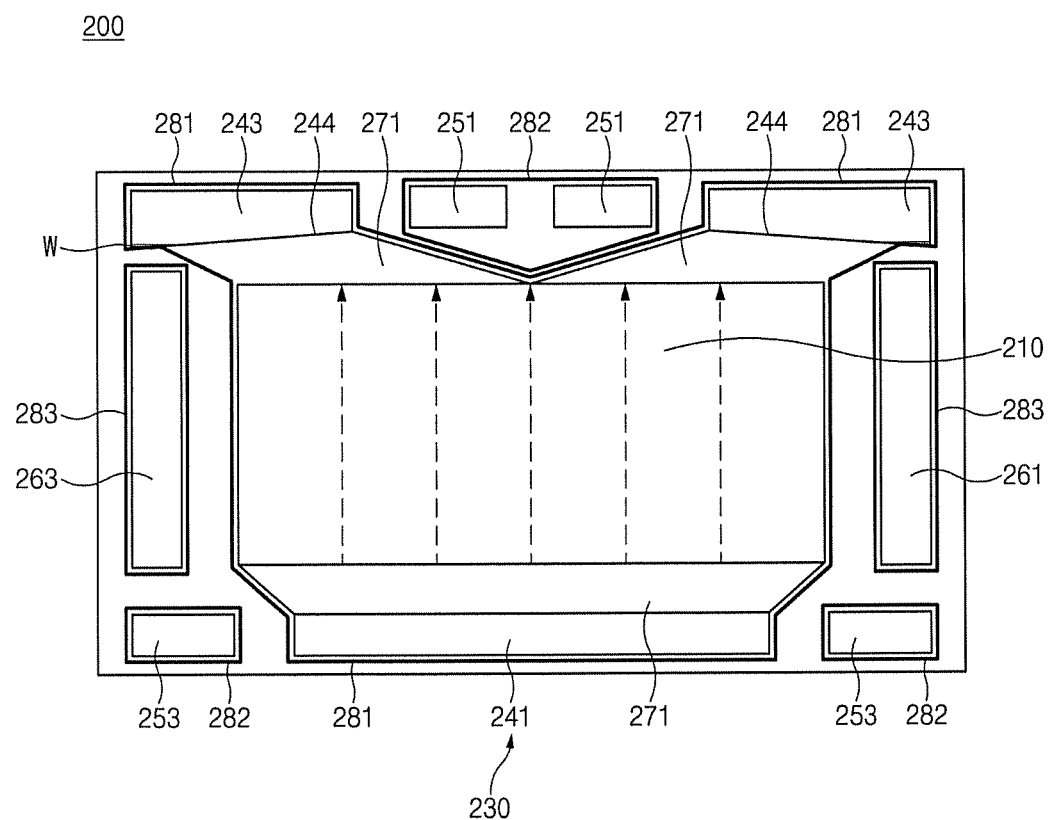
FIG. 5 is a front view illustrating a front surface of a separator for a fuel cell according to a first embodiment of the present disclosure.
Figure 6:
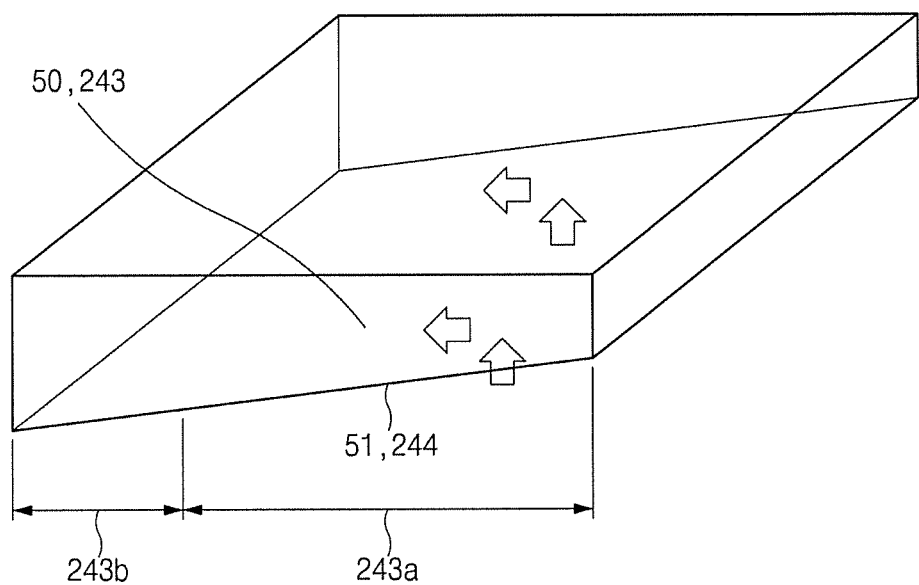
FIG. 6 is a perspective view illustrating a discharge passage applied to the fuel cell stack according to the first embodiment of the present disclosure.
Figure 7:
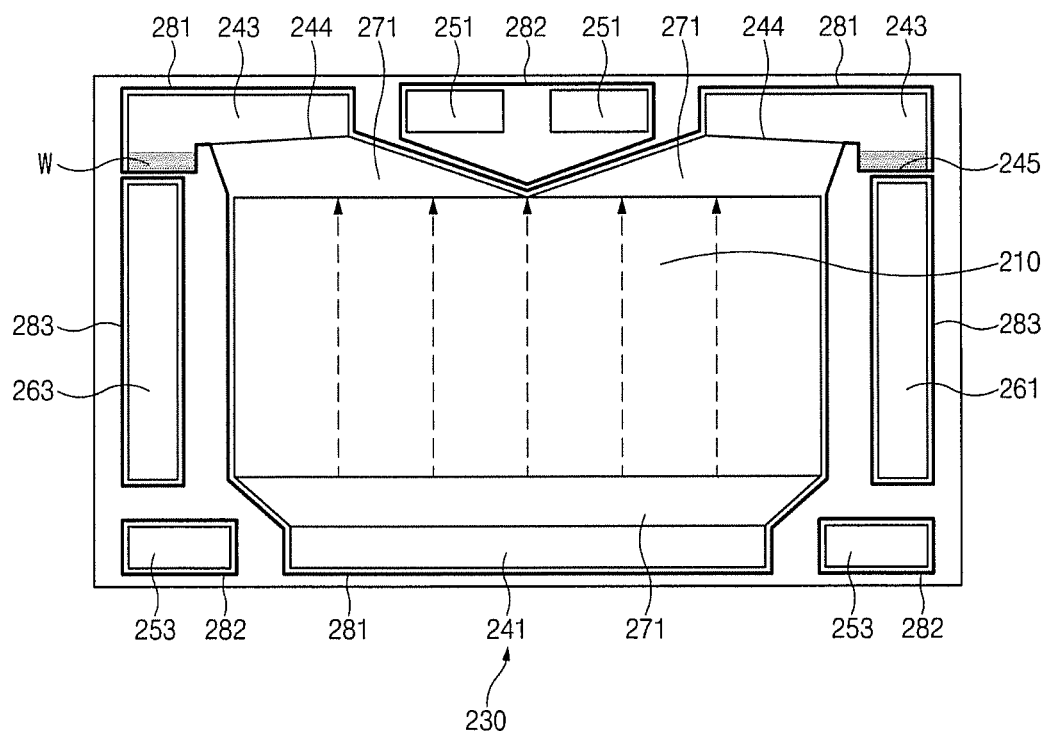
FIG. 7 is a front view illustrating a front surface of a separator for a fuel cell according to a second embodiment of the present disclosure.
Figure 8:
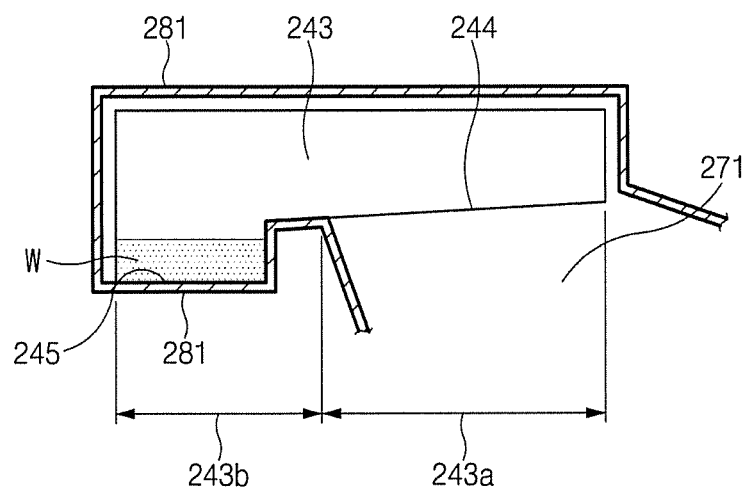
FIG. 8 is a partially enlarged view of FIG. 7.
Figure 11:
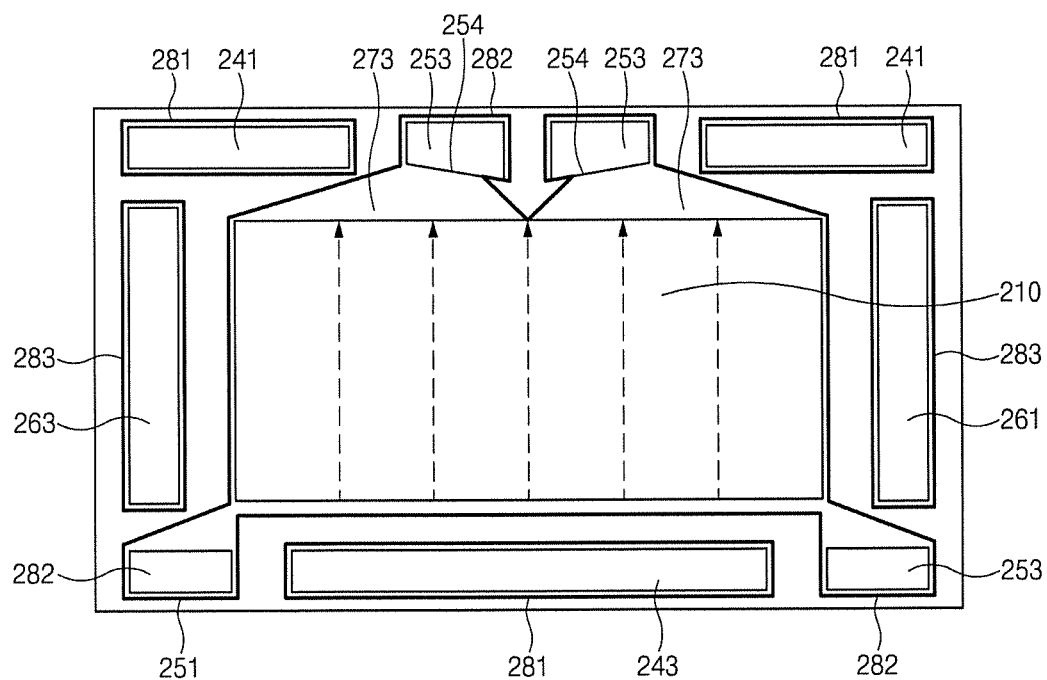
FIG. 11 is a front view illustrating a front surface of a separator for a fuel cell according to a third embodiment of the present disclosure.
Figure 12:
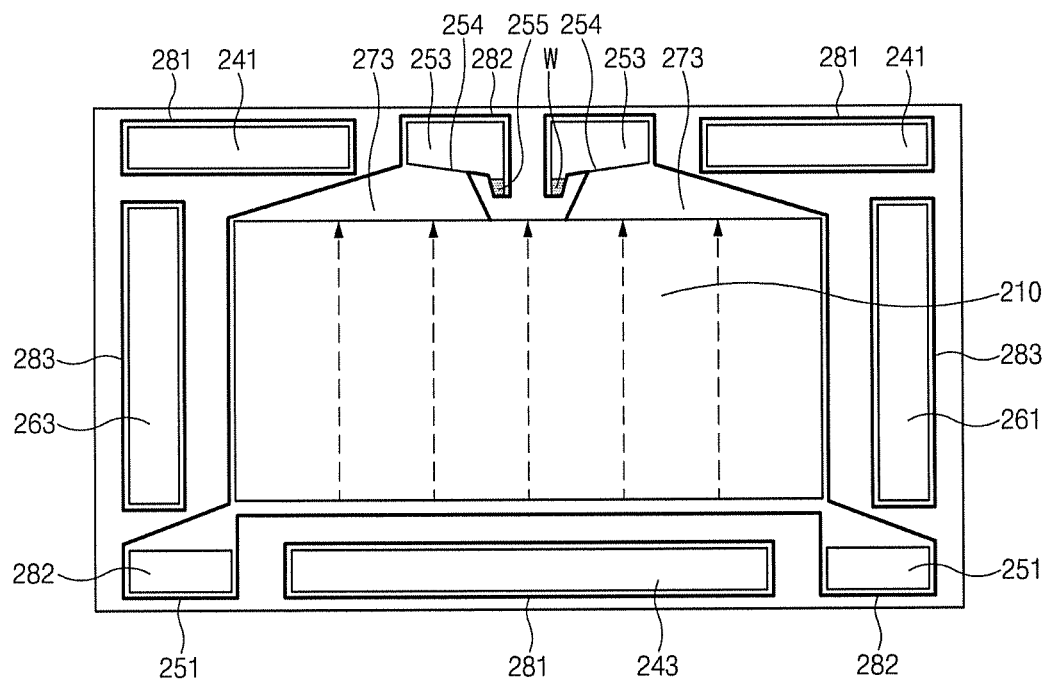
FIG. 12 is a front view illustrating a front surface of a separator for a fuel cell according to a fourth embodiment of the present disclosure.

Hereinafter, a separator 200 for a fuel cell and a fuel cell stack 10 will be described with reference to the embodiments of FIGS. 5 to 12. FIGS. 5 and 6 are views illustrating a first embodiment of the present disclosure, and FIGS. 7 to 10 are views illustrating a second embodiment of the present disclosure. The first and second embodiments correspond to views illustrating the separator 200 by which air is supplied from the lower side to the upper side and the fuel cell stack 10. FIG. 11 is a view illustrating a third embodiment of the present disclosure, and FIG. 12 is a view illustrating a fourth embodiment of the present disclosure. The third and fourth embodiments correspond to views illustrating the separator 200 by which air is supplied from the lower side to the upper side and the fuel cell stack 10.

First, referring to FIGS. 5 and 6, the separator 200 for a fuel cell according to the first embodiment of the present disclosure may include a channel 210, a manifold part 230, and a connector 271.

The channel 210 may have a plurality of passages that are flow passages for a reaction gas. Here, the reaction gas may be air that is an oxidizer gas and hydrogen that is a fuel gas.

Further, the passages of the channel 210 may be passages through which air flows and passages through which hydrogen flows. Further, cooling water for uniformly controlling the temperature of the whole fuel cell stack 10 by dissipating heat generated by a reaction of the fuel cells flows to the fuel cell stack 10, and the channel 210 may include passages through which the cooling water flows.

The manifold part 230 may be formed at a periphery of the channel 210, and may communicate with the passages such that a reaction gas may be introduced into and discharged from the channel 210.

Further, the connector 271 may connect the channel 210 and the manifold part 230 such that the reaction gas flows between the channel 210 and the manifold part 230.

In detail, as in the embodiment illustrated in FIG. 5, the manifold part 230 may include an inlet manifold 241 through which the reaction gas is introduced into the channel 210 and formed at a lower portion of the channel 210, and an outlet manifold 243 through which the reaction gas is discharged from the channel 210 to the outside and formed at an upper portion of the channel 210.

The inlet manifold 241 may communicate with the inlet of an opened plate such that the reaction gas may be introduced through the inlet manifold 241, and the introduced reaction gas may be supplied to the channel 210. The reaction gas introduced into the inlet manifold 241 may be introduced into the channel 210, may flow from the lower side to the upper side, and may be discharged to the outlet manifold 243. The outlet manifold 243 may communicate with the outlet 34 of the opened plate and may discharge the reaction gas to the outside.

Here, the manifold part 230 may include an air inlet manifold 241 and an air outlet manifold 243 through which air is introduced and discharged, a hydrogen inlet manifold 251 and a hydrogen outlet manifold 253 through which hydrogen is introduced and discharged, and a cooling water inlet manifold 261 and a cooling water outlet manifold 263 through which cooling water is introduced and discharged. In the first and second embodiments of FIGS. 5 to 10, an air lifted fuel cell stack 10 will be described as an example. In the first and second embodiments described below, the inlet manifold 241 will be described as an air inlet manifold 241 and the outlet manifold 243 will be described as an air outlet manifold 243, and the reference numerals will be used.

The connector 271 may connect the inlet manifold 241 and the outlet manifold 243 to the channel 210 and may be used as a passage through which the reaction gas flows. The connector 271 may connect the manifold part 230 and the channel 210 through a gasket provided in the separator 200. As an example, as in the embodiment of FIG. 5, the connector 271 may be provided by the channel 210, and the air gasket 281 including the air inlet manifold 241 and the air outlet manifold 243 through which air is introduced and discharged. Reference numeral 282 denotes a hydrogen gasket and reference numeral 283 denotes a cooling water gasket.

Here, when the reaction gas of the channel 210 flows to the outlet manifold 243, the condensate W generated by the reaction of the fuel cells may be introduced into the outlet manifold 243 together.

A lower surface of the outlet manifold 243 according to the present disclosure may include a first inclined part 244 inclined downwards towards a part that is not connected to the connector 271 such that the condensate W flows to a part in which the outlet manifold 243 and the connector 271 are not connected to each other. Here, a part of the lower surface of the outlet manifold 243, which is connected to the connector 271, is defined as a first area 243a, and a part of the lower surface of the outlet manifold 243, which extends from the first area 243a and is not connected to the connector 271 is defined as a second area 243b.

For example, referring to FIG. 5, the lower surface of the air outlet manifold 243 provided at an upper portion of the channel 210 may include a first inclined part 244 inclined downwards towards the second area 243b, which is not connected to the connector 271.

Referring to FIG. 6, when the plurality of unit cells are stacked, the outlet manifolds 243 formed in the plurality of separators 200 may be connected to each other to form a discharge passage 50. Further, the discharge passage 50 may include a first inclined surface 51 formed by connecting the plurality of inclined parts 244 on a lower surface of the discharge passage 50. In the first and second embodiments, the air outlet manifolds 243 may be connected to each other to form an air discharge passage 50. Further, the air inlet manifolds 241 are connected to each to form an air supply passage 40 (see FIG. 10).

The first inclined surface 51 formed by the first inclined parts 244 may function as a guide that may allow the condensate W to smoothly flow to the second area 243b if the plurality of air outlet manifolds 243 are connected to each other when the plurality of cells are stacked. Accordingly, as illustrated in FIG. 5, because the condensate W that flowed to the air outlet manifold 243 rapidly flows to the second area 243b due to the first inclined parts 244, the condensate W may be prevented from being introduced into the channel 210 by the gravity and may be easily discharged to the outside.

Accordingly, the fuel cell stack 10 according to the present disclosure may easily discharge the condensate and thus may minimize a flooding phenomenon. Further, because the condensate W is prevented from being collected in the outlet 34 of the fuel cell stack 10 to hamper flows of the gas in the stack outlet 34, differential deviation of the gas in the separators 200 provided in the plurality of cells may be minimized. Accordingly, because the unevenness of the flows of the gas in the plurality of cells is lowered, the performance of the fuel cell stack 10 may be improved as a result.

Meanwhile, referring to the embodiment of FIGS. 7 to 10, in the separator 200 for a fuel cell according to the second embodiment of the present disclosure, the second area 243b may include a stepped part 245 recessed to be stepped downwards from the first inclined part 244 including the first area 243a.

In detail, the first inclined part 244 may include the first area 243a, and the stepped part 245 may be formed at least a portion of the first area 243a. Accordingly, the stepped part 245 may be formed in an area that is not directly connected to the connector 271.

Further, the discharge passage 50 famed when the plurality of unit cells 20 are stacked in the fuel cell stack 10 may further include a condensate discharge groove 53.

The condensate discharge groove 53 may be formed by connecting the plurality of stepped parts 245, and may be formed along a direction in which the plurality of unit cells 20 are stacked. Further, the condensate discharge groove 53 may be connected to the first inclined surface 51, and may flow along the first inclined surface 51 to discharge the introduced condensate W to the outside of the fuel cell stack 10.

Figure 9:
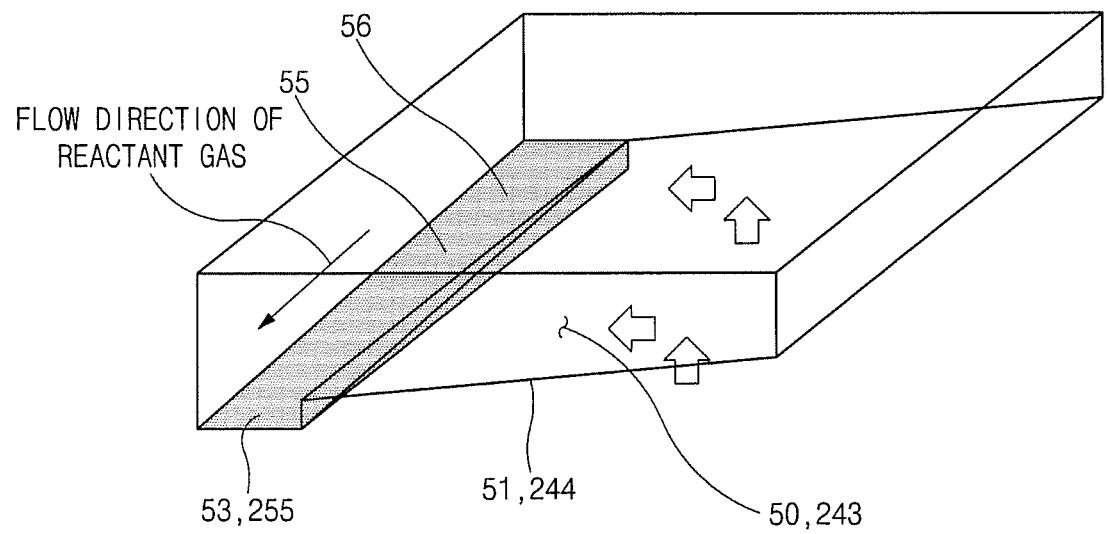
FIG. 9 is a perspective view illustrating a discharge passage applied to the fuel cell stack according to the second embodiment of the present disclosure.

In detail, referring to FIGS. 9 and 10, the condensate discharge groove 53 may extend along a lengthwise direction of the air discharge passage 50, and may be stepped at a lower side of the downwardly inclined first inclined surface 51. Accordingly, the condensate W introduced into the air outlet manifold 243 may flow to an outlet (the outlet 34 of the opened end plate 32) of the fuel cell stack 10 to be discharged after flowing towards the second area 243b along the first inclined surface 51. Then, the condensate W introduced from the air outlet manifolds 243 provided in the plurality of unit cells 20 may be introduced into the condensate discharge groove 53 of the air discharge passage 50 and flow to towards the outlet 34.

Meanwhile, although not illustrated, a lower surface of the condensate discharge groove 53 according to the second embodiment of the present disclosure may include a second inclined surface 56 that is inclined downwards in a flow direction of the reaction gas. For example, the second inclined surface 56 may be inclined more downwardly as it goes from the closed end plate 31 towards the opened end plate 32. In detail, as the stepped part 245 is inclined, a second inclined surface 56 may be formed in the condensate discharge groove 53 when the plurality of cells are stacked.

Meanwhile, referring to FIGS. 9 and 10, the second embodiment of the present disclosure may further include an insertion body 55 inserted into and attached to the lower surface of the condensate discharge groove 53 and having a second inclined surface 56 inclined downwards in a flow direction of the reaction gas. That is, the second inclined surface 56 may be inclined more downwardly as it goes from the closed end plate 31 towards the opened end plate 32.

In detail, the insertion body 55 may have a size corresponding to a length and a width of the condensate discharge groove 53. Further, the second inclined surface 56 formed in the insertion body 55 may be inclined along the lengthwise direction of the condensate discharge groove 53, and may be inclined downwards towards the opened end plate 32.

Accordingly, the second inclined surface 56 may guide the condensate W introduced into the condensate discharge groove 53 such that the condensate W may flow towards an outlet (the outlet 34 of the opened end plate 32) of the fuel cell stack 10. Accordingly, the condensate may be easily discharged to the outside of the fuel cell stack 10.

Meanwhile, hereinafter, a third embodiment and a fourth embodiment of the present disclosure will be described with reference to FIGS. 11 and 12. The third and fourth embodiments correspond to views illustrating a hydrogen lifted fuel cell stack 10 by which hydrogen is supplied from the lower side to the upper side.

In the third embodiment and the fourth embodiment described below are different from the first embodiment and the second embodiment in that the inlet manifold is a hydrogen inlet manifold 251 and the outlet manifold is a hydrogen outlet manifold 253, and accordingly, are different in that the first inclined part 254 and the stepped part 255 are formed in the hydrogen outlet manifold 253. Here, because the shapes and functions of the first inclined part 254 and the stepped part 255 are the same as those of the first embodiment and the second embodiment, a detailed description of the same configurations will be omitted.

First, referring to FIG. 11, the separator 200 for a fuel cell according to the third embodiment of the present disclosure may include a channel 210, a manifold part 230, and a connector 273.

Here, the manifold part 230 may include an air inlet manifold 241 and an air outlet manifold 243 through which air is introduced and discharged, a hydrogen inlet manifold 251 and a hydrogen outlet manifold 253 through which hydrogen is introduced and discharged, and a cooling water inlet manifold 261 and a cooling water outlet manifold 263 through which cooling water is introduced and discharged. In the third and fourth embodiments of FIGS. 11 to 12, a hydrogen lifted fuel cell stack 10 will be described as an example. Accordingly, in the third and fourth embodiments described below, the inlet manifold will be described as the hydrogen inlet manifold 251 and the outlet manifold will be described as the hydrogen outlet manifold 253, and the same reference numerals will be used.

Further, the connector 273 may connect the channel 210 and the hydrogen inlet manifold 251 and the hydrogen outlet manifold 253. Further, the connector 273 may be partitioned and sealed by the hydrogen gasket 282 to function as a passage through which hydrogen flows between the channel 210 and the hydrogen outlet manifold 253. In the third and fourth embodiments, hydrogen may be introduced into the channel 210 after being supplied to the hydrogen inlet manifold 251, and may flow from the lower side to the upper side to be introduced into the hydrogen outlet manifold 253.

Here, when hydrogen flows to the hydrogen outlet manifold 253, the condensate generated by the reaction of the fuel cells may be introduced into the hydrogen outlet manifold 253 together.

The lower surface of the hydrogen outlet manifold 253 according to the third embodiment may include a first inclined part 254 inclined downwards towards a part that is not connected to the connector 273.

Further, although not illustrated, when the plurality of unit cells 20 are stacked, the hydrogen outlet manifolds 253 formed in the plurality of separators 200 may be connected to each other to form a hydrogen discharge passage 60. Further, the hydrogen discharge passage 60 may include a first inclined surface 61 formed by connecting the plurality of inclined parts 254 on a lower surface of the hydrogen discharge passage 60. In the third and fourth embodiments, the hydrogen outlet manifolds 253 may be connected to each other to form a hydrogen discharge passage 60.

Meanwhile, referring to FIG. 12, the separator 200 for a fuel cell according to the fourth embodiment of the present disclosure may include a stepped part 255 in the second area 253b that is not connected to the connector 273 on a lower surface of the hydrogen outlet manifold 253. The stepped part 255 may be recessed to be stepped downwards in the first inclined part 254 including the first area 253a connected to the connector 273.

Further, although not illustrated, in the fourth embodiment of the present disclosure, the hydrogen discharge passage 60 may further include a condensate discharge groove 63. The condensate discharge groove 63 may be formed by connecting the plurality of stepped parts 255, and may be formed along a direction in which the plurality of unit cells 20 are stacked. Further, the condensate discharge groove 63 may be connected to the first inclined surface 61, and may flow along the first inclined surface 61 to discharger the introduced condensate.

In this way, in the separator for a fuel cell and the fuel cell stack including the separator according to the present disclosure, because the condensate that flowed to the air outlet manifold rapidly flows to the second area due to the first inclined part, it may be prevented from being introduced to the channel again due to the gravity and thus may be easily discharged to the outside. Accordingly, the fuel cell stack according to the present disclosure may easily discharge the condensate and thus may minimize a flooding phenomenon.

Further, in the separator for a fuel cell and the fuel cell stack including the separator according to the present disclosure, because the condensate may be prevented from being collected in the outlet of the fuel cell stack to hamper flows of the gas in the stack outlet, deviation of differential pressures of the gas in the separators provided in the plurality of cells may be minimized. Accordingly, because the unevenness of the flows of the gas in the plurality of cells is lowered, the performance of the fuel cell stack may be improved as a result.

Although the specific embodiments of the present disclosure have been described, the spirit and scope of the present disclosure are not limited to the specific embodiments and may be variously corrected and modified by those skilled in the art to which the present disclosure pertains without departing from the scope of the present disclosure claimed in the claims.

What is claimed is:

1. A fuel cell separator for preventing flooding, comprising:
    a channel having a passage that is a flow path of a reaction gas;
    a manifold part formed at a peripheral of the channel and communicating with the passage such that the reaction gas is introduced into and discharged from the channel; and
    a connector connecting the channel and the manifold part such that the reaction gas flows between the channel and the manifold part,
    wherein the manifold part includes:
    an inlet manifold through which the reaction gas is introduced into the channel and formed at a lower portion of the channel; and
    an outlet manifold configured to discharge the reaction gas from the channel to an outside of a fuel cell and formed at an upper portion of the channel, and
    wherein a lower surface of the outlet manifold includes a first area connected to the connector and a second area extending from the first area and not connected to the connector,
    wherein the lower surface of the outlet manifold further includes a first inclined part including the first area and inclining downwards towards the second area, such that condensate generated by a reaction of the fuel cell and introduced through the connector flows to the second area, and
    wherein the second area is separated from the connector by a gasket disposed along the second area such that the condensate introduced into the second area is prevented from being introduced into the channel again through the connector.

2. The fuel cell separator of claim 1, wherein the inlet manifold is an air inlet manifold through which supplied air is introduced into the channel, and
    wherein the outlet manifold is an air outlet manifold through which the air is discharged from the channel to the outside.

3. The fuel cell separator of claim 1, wherein the inlet manifold is a hydrogen inlet manifold through which supplied hydrogen is introduced into the channel, and
    wherein the outlet manifold is a hydrogen outlet manifold through which the hydrogen is discharged from the channel to the outside.

4. The fuel cell separator of claim 1,
    wherein the second area includes a stepped part recessed to be stepped downwards from the first inclined part.

5. A fuel cell stack comprising:
    a plurality of unit cells, each of which includes a membrane electrode assembly including an electrolyte membrane, an anode, and a cathode, and separators disposed on opposite sides of the membrane electrode assembly, and which are stacked; and end plates coupled to opposite stack direction sides of the plurality of unit cells to couple the plurality of unit cells and one of the end plates has an inlet and an outlet through which a reaction gas is introduced and discharged, wherein each of the separators includes:

a channel having a passage that is a flow path of the reaction gas;

a manifold part including an inlet manifold, formed at a lower portion of the channel and connected to the inlet to communicate with the passage, configured to introduce the reaction gas into the channel, and an outlet manifold, formed at an upper portion of the channel and connected to the outlet, configured to discharge the reaction gas from the channel to an outside of the fuel cell stack; and a connector connecting the channel and the manifold part such that the reaction gas flows between the channel and the manifold part, and wherein a lower surface of the outlet manifold includes a first area connected to the connector and a second area extending from the first area and not connected to the connector, wherein the lower surface of the outlet manifold further includes a first inclined part including the first area and inclining downwardly towards the second area, such that condensate generated by a reaction of a fuel cell and introduced through the connector flows to the second area, and wherein the second area is separated from the connector by a gasket disposed along the second area such that the condensate introduced into the second area is prevented from being introduced into the channel again through the connector.

6. The fuel cell stack of claim 5, wherein outlet manifolds formed in a plurality of separators are connected to each other to form a discharge passage when the plurality of unit cells are stacked, and wherein the discharge passage includes a first inclined surface formed by connecting a plurality of first inclined parts to a lower surface of the discharge passage.

7. The fuel cell stack of claim 6, wherein the second area includes a stepped part recessed to be stepped downwards from the first inclined part, and wherein the discharge passage further includes a condensate discharge groove formed by connecting a plurality of stepped parts in a direction in which the plurality of unit cells are stacked, and connected to the first inclined surface, such that the condensate introduced after flowing along the first inclined surface is discharged.

8. The fuel cell stack of claim 7, wherein a lower surface of the condensate discharge groove includes:

a second inclined surface inclined downwards in a flow direction of the reaction gas.

9. The fuel cell stack of claim 7, wherein:

an insertion body is inserted into and attached to a lower surface of the condensate discharge groove, and has a second inclined surface inclined downwards in a flow direction of the reaction gas.

* * * * *